United States Patent [19]
Haga et al.

[11] Patent Number: 5,651,423
[45] Date of Patent: Jul. 29, 1997

[54] POWER STEERING APPARATUS

[75] Inventors: Kyosuke Haga, Anjo; Mikio Suzuki, Hekinan; Yoshiharu Inaguma, Nagoya; Hideya Kato, Okazaki, all of Japan

[73] Assignee: Toyoda Koki Kabushiki Kaisha, Kariya, Japan

[21] Appl. No.: 452,699

[22] Filed: May 30, 1995

[30] Foreign Application Priority Data

May 31, 1994 [JP] Japan ................................. 6-118663

[51] Int. Cl.$^6$ .................................................. B62D 5/087
[52] U.S. Cl. .................................... 180/403; 180/442
[58] Field of Search ................................ 180/417, 421, 180/403, 422, 441, 442

[56] References Cited

U.S. PATENT DOCUMENTS

| | | | |
|---|---|---|---|
| 4,434,866 | 3/1984 | Duffy | 180/421 |
| 4,601,358 | 7/1986 | Kozuka et al. | 180/421 |
| 5,135,068 | 8/1992 | Emori et al. | 180/421 |
| 5,439,070 | 8/1995 | Haga et al. | 180/421 |
| 5,471,838 | 12/1995 | Suzuki et al. | 180/421 |

FOREIGN PATENT DOCUMENTS

| | | |
|---|---|---|
| 0 192 385 | 8/1986 | European Pat. Off. . |
| 0 642 970 | 3/1995 | European Pat. Off. . |
| 0 658 468 | 6/1995 | European Pat. Off. . |
| 2 079 691 | 1/1982 | United Kingdom . |

*Primary Examiner*—Brian L. Johnson
*Assistant Examiner*—Avraham Lerner
*Attorney, Agent, or Firm*—Oblon, Spivak, McClelland, Maier & Neustadt, P.C.

[57] ABSTRACT

A hydraulic power steering apparatus includes a motor-driven pump which discharges pressurized working fluid at a flow rate proportional to the rotational speed. A load-pressure responsive valve is connected to a discharge passage to which the pressurized fluid is discharged from the pump. The load-pressure responsive valve bypasses the pressurized fluid to a reservoir when the control valve is in a neutral state, thereby reducing the amount of the pressurized fluid supplied to the control valve, and increases the amount of the pressurized fluid supplied to the control valve when the load pressure of the pump increases upon operation of the control valve. With this control, the energy consumed by the pump can be reduced.

10 Claims, 5 Drawing Sheets

POWER STEERING APPARATUS

BACKGROUND OF THE INVENTION

1. Field of the Invention

The present invention relates to a hydraulic power steering apparatus equipped with a motor-driven pump.

2. Discussion of Related Art

Japanese Patent Publication (kokoku) No. 3-29628 discloses a hydraulic power steering apparatus equipped with a motor-driven pump. In that power steering apparatus, the current of the motor for driving the pump is detected to indirectly determine the steering load, and the motor is controlled based on the detected current.

In such a power steering apparatus, the pump is driven at a low speed or is stopped when a steering wheel is not operated. Therefore, the energy required to drive the pump can be reduced.

However, in the above-described structure, the current of the motor for driving the pump is fed back to a controller so as to control the rotational speed of the motor, thereby controlling the amount of working fluid discharged from the pump. Consequently, the controller for controlling the motor becomes complicated, resulting in increased costs.

SUMMARY OF THE INVENTION

An object of the present invention is to provide an improved hydraulic power steering apparatus which can reduce the energy required to drive a pump without increasing the complexity of a controller of the apparatus.

Another object of the present invention is to provide an improved hydraulic power steering apparatus which is capable of controlling the amount of working fluid supplied from the pump to a control valve in accordance with the load pressure of the pump which varies in response to steering operation.

Still another object of the present invention is to provide an improved hydraulic power steering apparatus which can reduce the energy required to drive the pump when a vehicle in which the power steering apparatus is installed is traveling at a high speed.

According to a first aspect of the present invention, there is provided a hydraulic power steering apparatus which includes a motor driven by a motor drive circuit, a pump driven by the motor to discharge pressurized working fluid at a flow rate proportional to the rotational speed of the pump, a power cylinder for generating an assist force, a control valve connected to the pump, to a pair of chambers of the power cylinder, and to a reservoir and responsive to a steering operation to supply the pressurized fluid to the chambers of the power cylinder, and a load-pressure responsive valve provided between a passage to which the pressurized fluid is discharged from the pump and a low pressure region and operable for bypassing the fluid discharged from the pump to the low pressure region when the control valve is in a neutral state so as to reduce the amount of pressurized fluid supplied to the control valve and for increasing the amount of pressurized fluid supplied to the control valve when the load pressure of the pump increases upon operation of the control valve.

According to a second aspect of the present invention, there is provided a hydraulic power steering apparatus which includes a sensor for detecting a vehicle speed, a motor driven at a rotational speed corresponding to the vehicle speed detected by the sensor, a pump driven by the motor to discharge pressurized working fluid at a flow rate proportional to the rotational speed of the pump, a power cylinder for generating an assist force, a control valve connected to the pump, to a pair of chambers of the power cylinder, and to a reservoir and responsive to a steering operation to supply the pressurized fluid to the chambers of the power cylinder, and a load-pressure responsive valve provided between a passage to which the pressurized fluid is discharged from the pump and a low pressure region and operable for bypassing the fluid discharged from the pump to the low pressure region when the control valve is in a neutral state so as to reduce the amount of pressurized fluid supplied to the control valve and for increasing the amount of pressurized fluid supplied to the control valve when the load pressure of the pump increases upon operation of the control valve.

In the present invention, working fluid discharged from the motor-driven pump is bypassed to the low pressure region when the load pressure is low, i.e., when the control valve is in a neutral state, thereby reducing the amount of pressurized fluid supplied to the control valve. Accordingly, the energy consumed by the pump can be reduced when the steering wheel is not operated, during which no assist force is needed. This reduces the fuel consumption of the vehicle.

Also, since it is not necessary to control the rotational speed of the motor in order to reduce the energy consumption, the costs of the control system for controlling the flow rate can be reduced.

In the power steering apparatus which employs a control mechanism for decreasing the rotational speed of the motor with an increase in vehicle speed in addition to the above-described structure for bypass control, energy consumption can be reduced even when the vehicle travels at high speed. Accordingly, the fuel consumption of the vehicle can be further decreased.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF PREFERRED EMBODIMENTS

Embodiments of the present invention will now be described with reference to the accompanying drawings.

Figure 1:
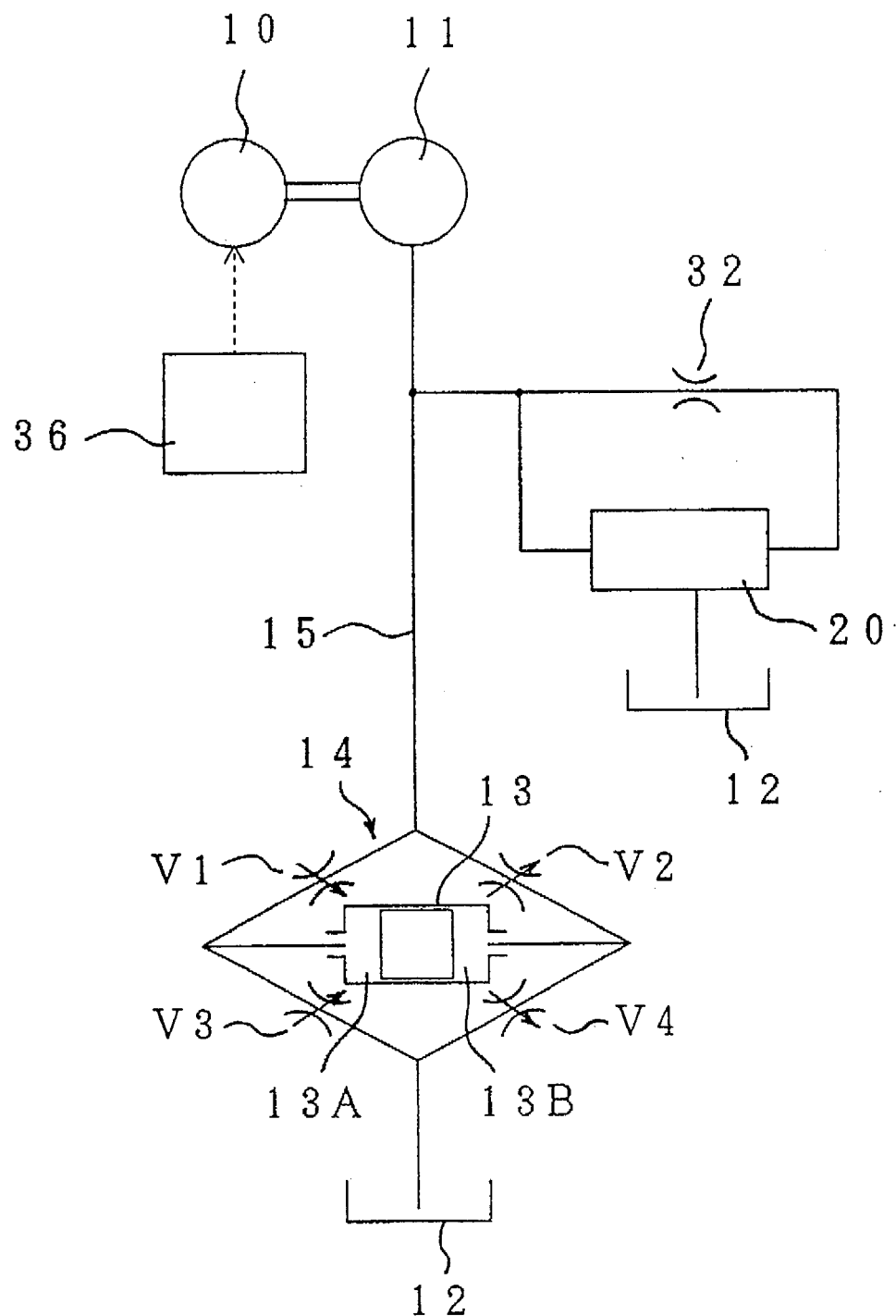
FIG. 1 is a diagram showing the overall structure of a power steering apparatus according to a first embodiment of the present invention.

FIG. 1 shows the overall structure of a hydraulic power steering apparatus according to a first embodiment of the present invention. The power steering apparatus comprises a pump 11 driven by a motor 10, a reservoir 12, a power cylinder 13 for generating an assist force which assists steering operation, and a rotary control valve 14 which responds to a rotation of a steering wheel so as to control the supply of pressurized fluid from the pump 11 to the power cylinder 13.

The control valve 14 is provided with variable throttles V1, V2, V3 and V4 disposed in four passages which are connected to a discharge passage 15 of the pump 11, a pair of chambers 13A and 13B of the power cylinder 13 and the reservoir 12. The opening areas of the variable throttles V1, V2, V3 and V4 vary in response to steering operation.

A load-pressure responsive valve 20 is provided between the discharge passage 15 and the reservoir 12 (a lower pressure region). The load-pressure responsive valve 20 bypasses part of the pressurized fluid from the discharge passage 15 to the reservoir 12 when the load pressure is low, thereby reducing the amount of pressurized fluid supplied to the control valve 14. When the load pressure increases, the valve 20 stops the bypassing so that the whole amount of pressurized fluid discharged to the discharge passage 15 is supplied to the control valve 14.

Figure 2:
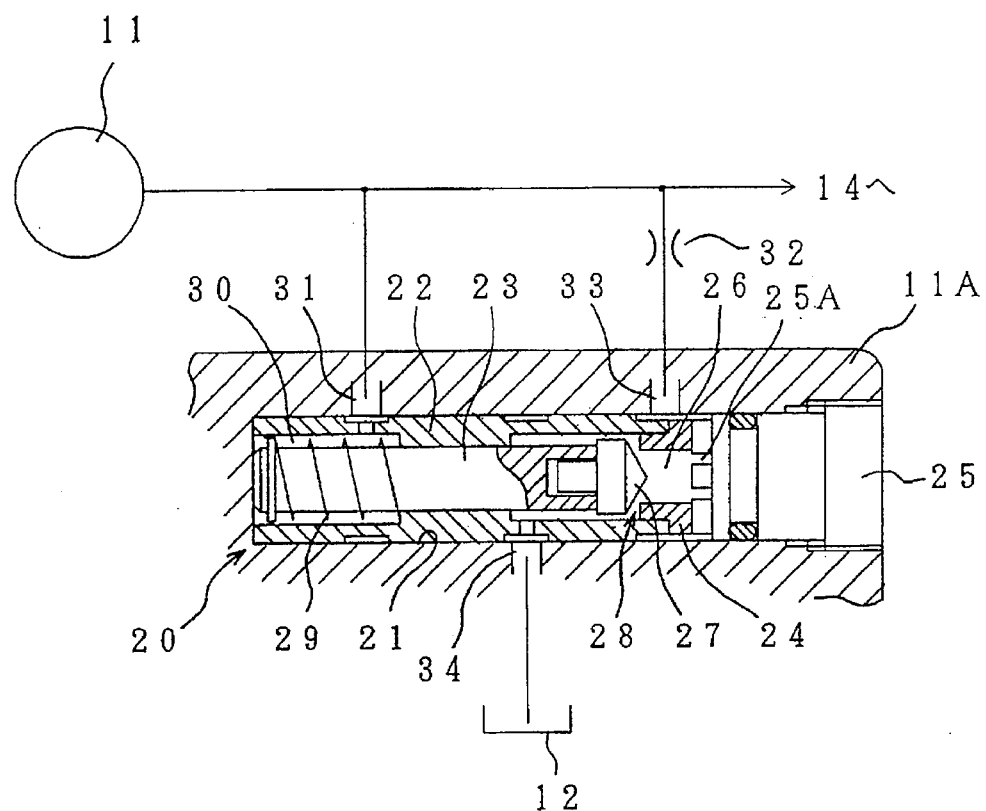
FIG. 2 is a sectional view of the load-pressure responsive valve used in the power steering apparatus shown in FIG. 1.

FIG. 2 shows an example of the load-pressure responsive valve 20. In this example, the load-pressure responsive valve 20 is formed as a cartridge which is fitted into a valve bore 21 formed in a housing 11A of the pump 11. In detail, the valve 20 includes a sleeve 22 which is fitted into the valve bore 21, a spool 23 which is disposed in the sleeve 22 for sliding movement, an annular seat 24 attached to one end of the sleeve 22, and a plug 25 which is fitted into the open end of the valve bore 21 so as to close the valve bore 21. The seat 24 has an opening 26 therein which is slightly smaller than the outer diameter of the spool 23.

A conical poppet 27 is attached to one end of the spool 23 so as to open and close the opening 26 of the seat 24. The poppet 27 cooperates with the seat 24 to form a control throttle 28. The poppet 27 is allowed to slightly move in a radial direction with respect to the spool 23, thereby providing the concentricity with the seat 24. Accordingly, even when the concentricity between the spool 23 and the seat 24 is imperfect due to machining errors, assembly errors, and the like, the poppet 27 can securely close the opening 26 of the seat 24.

A spring 29 is disposed between the spool 23 and the sleeve 22. The spring 29 forces the spool 23 to move in a direction such that the poppet 27 separates from the opening 26 of the seat 24. Due to the spring force of the spring 29, the spool 23 is usually maintained at a retracted position shown in FIG. 2 so that the opening of the control throttle 28 is maintained constant.

The housing 11A of the pump 11 is formed with leading passages 31 and 33 and a drain passage 34. The leading passage 31 leads the fluid discharged from the pump 11 directly to a spring chamber 30 formed at one side of the spool 23. The leading passage 33 leads the fluid discharged from the pump 11 to the opening 26 of the seat 24 via a metering orifice 32 and cut-away portions 25A formed in the plug 25. The drain passage 34 is connected to the leading passage 33 via the opening 26 and drains pressurized fluid supplied from the leading passage 33 to the reservoir 12 when the poppet 27 separates from the opening 26 of the seat 24.

It is assumed that the outer diameter of the spool 23 is A1, and the diameter of the opening 26 of the seat 24 is A2 (A1>A2), and the pressures of fluid supplied to the leading passages 31 and 33 are P1 and P2, respectively, and the spring force of the spring 29 is F. In this case, the spool 23 is balanced when the following equality is satisfied:

$$A1 \cdot P1 = A2 \cdot P2 + F$$

In the state where the control throttle 28 is opened, a difference is produced between the pressures P1 and P2. The pressure difference is small when the load pressure is low, and the following inequality is satisfied:

$$A1 \cdot P1 - A2 \cdot P2 < F \qquad (1)$$

On the contrary, when the load pressure increases, the difference between the pressures P1 and P2 increases, and the following inequality is satisfied:

$$A1 \cdot P1 - A2 \cdot P2 > F \qquad (2)$$

The load-pressure responsive valve 20 is not limited to the valve shown in FIG. 2, and other types of valves may be used, provided that they can bypass part of the pressurized fluid from the discharge passage 15 to the low pressure region (reservoir 12), and can stop the bypassing when the load pressure increases.

Figure 3:
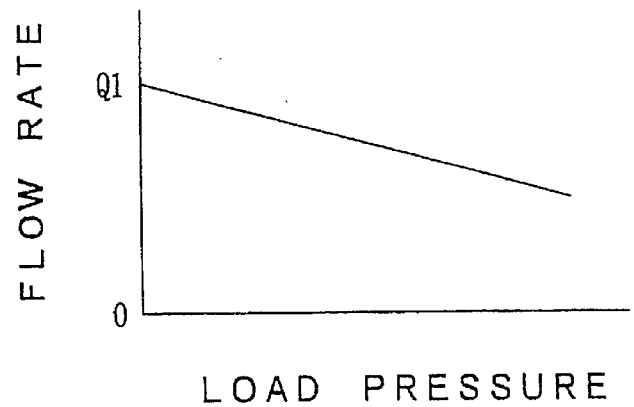
FIG. 3 is a graph showing the relationship between load pressure and the flow rate of fluid discharged from the pump.

In FIG. 1, numeral 36 denotes a motor drive circuit for driving the motor 10. The motor drive circuit 36 supplies the motor 10 with voltage having a constant amplitude so that the motor 10 rotates at a constant rotational speed. However, the flow rate of pressurized fluid discharged to the discharge passage 15 from the pump 11 gradually decreases as the load pressure increases, as shown in FIG. 3. This decrease of the flow rate is caused by increase in the drive torque of the pump 11 and internal leakage of the pump 11, both of which occur due to increase in the load pressure.

In the power steering apparatus having the above-described structure, when the control circuit is turned on, voltage having a constant amplitude is supplied to the motor 10 by the motor drive circuit 36 so that pressurized fluid is discharged from the pump 11 to the discharge passage 15 at a flow rate corresponding to the rotational speed of the motor 10. The pressurized fluid discharged to the discharge passage 15 is supplied to the control valve 14.

When the control valve 14 is in a neutral state, the load pressure is low, so that only a small pressure difference is produced between opposite end surfaces of the spool 23 of the load-pressure responsive valve 20, which end surfaces have different pressure receiving areas. In this case, the inequality (1) is satisfied, and the poppet 27 is separated from the opening 26 of the seat 24, as shown in FIG. 2. In this state, the pressurized fluid which is led to the leading passage 33 via the orifice 32 is drained to the reservoir 12 via the opening 26 and the drain passage 34. As a result, the flow rate of the pressurized fluid supplied to the control valve 14 is decreased to the minimum flow rate Q2, as shown in FIG.

4. Consequently, pressure loss due to the variable throttles of the control valve 14 is reduced, resulting in reduced energy consumption.

When the control valve 14 is operated in response to a steering operation, the opening areas of the variable throttles V1 and V4 are increased while the opening areas of the variable throttles V2 and V3 are decreased, for example. With this operation, the pressure of fluid discharged from the pump 11, i.e., the load pressure gradually increases. When the load pressure reaches P1, the advancing force acting on the spool 23 exceeds the biasing force produced by the spring 29 due to an increase in the pressure difference between the upstream and downstream sides of the orifice 32 and the difference between the pressure receiving areas of the opposite ends of the spool 23. As a result, the spool 23 is advanced against the spring 29 in a direction such that the opening 26 of the seat 24 is closed, thereby decreasing the opening area of the control throttle 28. When the load pressure further increases, the control throttle 28 is completely closed, and the amount of fluid bypassed to the reservoir 12 becomes zero. In this manner, the flow rate of the pressurized fluid supplied to the control valve 14 is increased from the minimum flow rate Q2 to a rate close to the maximum flow rate Q1, as shown in FIG. 3, so that a sufficient assist force is produced.

Next, a second embodiment of the present invention will be described with reference to FIG. 5. In the present embodiment, a load-pressure responsive valve is operated taking advantage of the phenomenon that the flow rate of fluid discharged from the pump 11 decreases as the load pressure increases.

Figure 5:
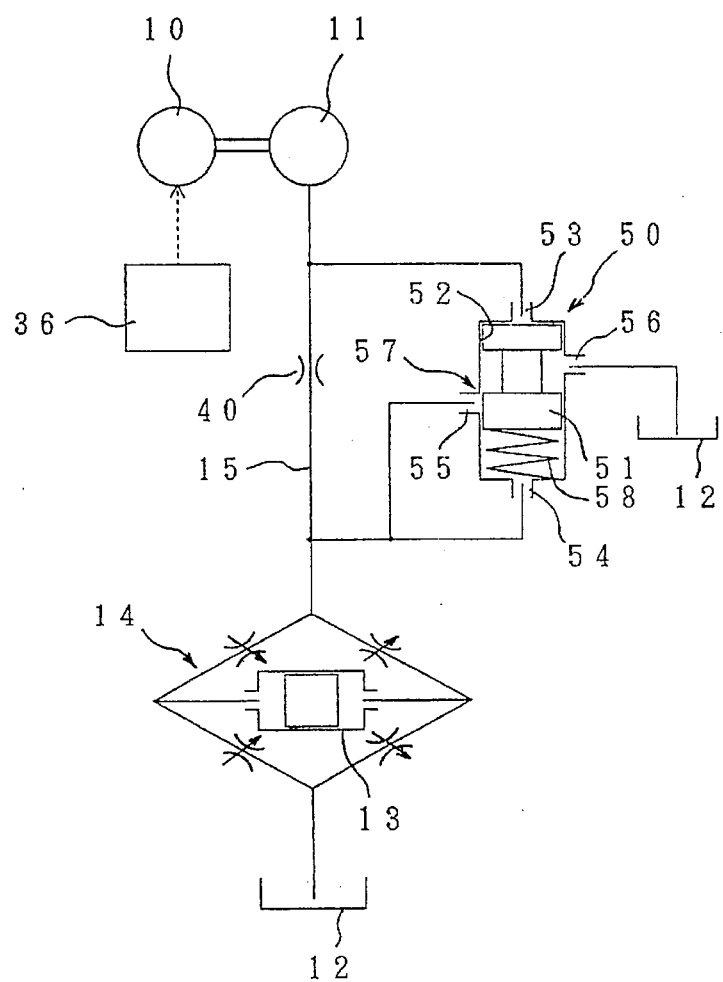
FIG. 5 is a diagram showing the overall structure of a power steering apparatus according to a second embodiment of the present invention.

As shown in FIG. 5, there are provided a metering orifice 40 inserted in the middle of the discharge passage 15, and a load-pressure responsive valve 50 which responds to the pressure difference between the upstream and downstream sides of the metering orifice 40. The load-pressure responsive valve 50 is provided with a spool 51 which is slidably guided by a valve bore 52. Opened into the valve bore 52 are leading passages 53 and 54 which lead pressurized fluid from the upstream and downstream sides of the metering orifice 40 to a pair of pressure chambers formed on both sides of the spool 51. Also, a load-pressure introducing passage 55 and a drain passage 56 are opened to the valve bore 52. The load-pressure introducing passage 55 is opened and closed by displacement of the spool 51. The drain passage 56 communicates with a reservoir 12. A variable throttle 57 is formed between the load-pressure introducing passage 55 and the spool 51.

A spring 58 is disposed in a chamber at one end of the spool 51 to which the pressurized fluid is introduced from the downstream side of the metering orifice 40. The spring 58 urges the spool 51 to move in a direction for closing the load pressure introducing passage 55 (variable throttle 57).

Figure 4:
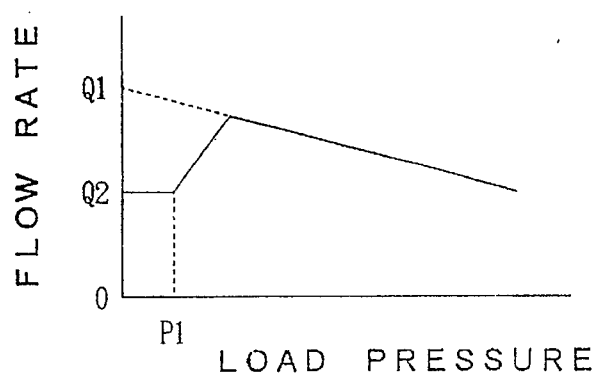
FIG. 4 is a graph showing the relationship between load pressure and the flow rate of fluid supplied to the control valve.
Figure 6:
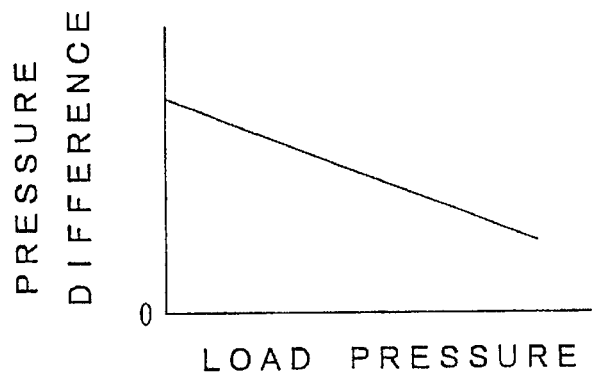
FIG. 6 is a graph showing the relationship between load pressure and the pressure difference between the upstream and downstream sides of the constant throttle.

In the present embodiment, the flow rate of pressurized fluid discharged from the pump 11 is maintained large when the control valve 14 is in a neutral state, because the load pressure is low in such a state. In this state, the pressure difference between the upstream and downstream sides of the metering orifice 40 becomes large as shown in FIG. 6. Accordingly, the spool 51 is moved against the spring force of the spring 58 in the direction for opening the variable throttle 57, so that the pressurized fluid led to the load-pressure introducing passage 55 is drained to the reservoir 12 via the variable throttle 57 and the drain passage 56. As a result, the flow rate of pressurized fluid supplied to the control valve 14 is decreased to the minimum flow rate Q2 (see FIG. 4). Consequently, the energy consumption can be reduced when the control valve 14 is in the neutral state.

When the control valve 14 is operated in response to a steering operation, the load pressure increases. With the increase of the load pressure, the amount of fluid discharged from the pump 11 decreases (see FIG. 3), so that the pressure difference between the upstream and downstream sides of the metering orifice 40 decreases. As a result, the spool 57 is moved by the spring force of the spring 58 in the direction for closing the variable throttle 57, so that the flow rate of the pressurized fluid supplied to the control valve 14 is increased to a rate close to the maximum flow rate Q1, like in the first embodiment.

Next, a third embodiment of the present invention will be described with reference to FIG. 7. The present embodiment is the same as the first embodiment, except that the flow rate of fluid supplied to the control valve 14 is controlled in accordance with vehicle speed as well as load pressure.

Figure 7:
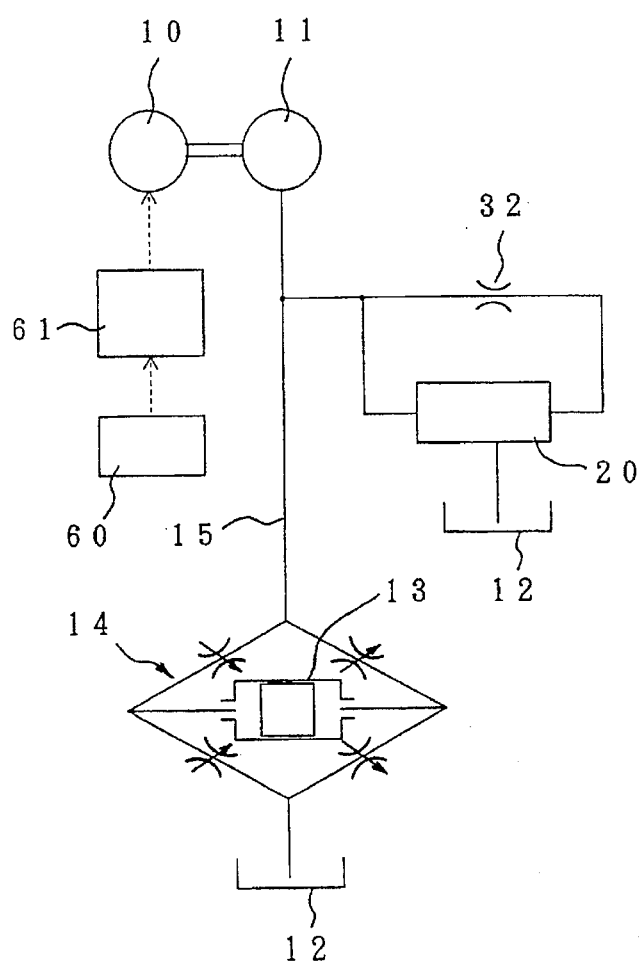
FIG. 7 is a diagram showing the overall structure of a power steering apparatus according to a third embodiment of the present invention.
Figure 8:
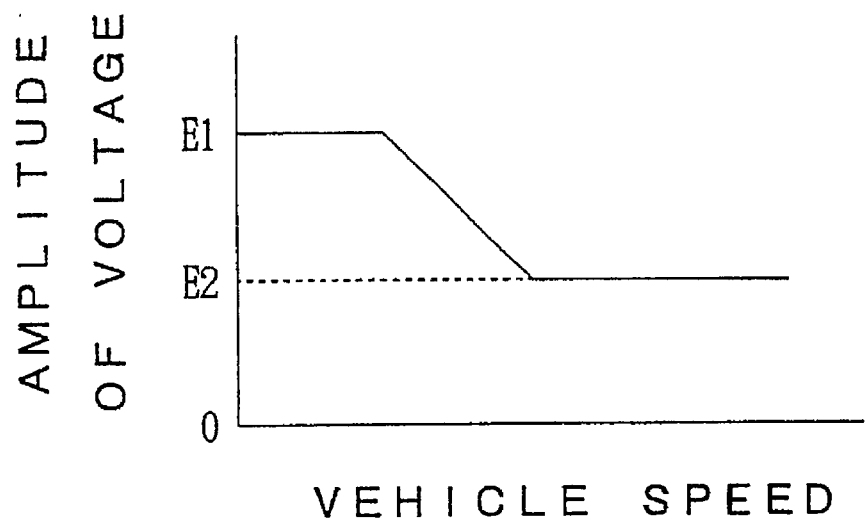
FIG. 8 is a graph showing the relationship between vehicle speed and the amplitude of voltage supplied to the motor.

In FIG. 7, numeral 60 denotes a sensor for detecting the speed of a vehicle. A vehicle speed signal indicating the vehicle speed detected by the sensor 60 is input to a motor drive circuit 61. The motor drive circuit 61 controls the amplitude of voltage supplied to the motor 10 in accordance with the vehicle speed signal input thereto such that the rotational speed of the motor 10 decreases as the vehicle speed increases, as shown in FIG. 8.

Figure 9:
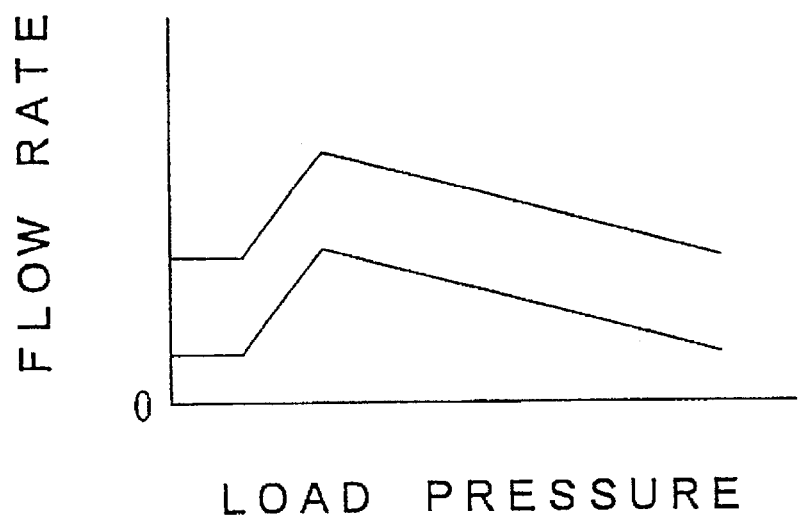
FIG. 9 is a graph showing the relationship between load pressure and the flow rate of fluid supplied to the control valve.

In the present embodiment, since the rotational speed of the motor 10 is decreased as the vehicle speed increases, the amount of fluid supplied to the control valve 14 is reduced when the vehicle travels at a high speed compared to the case where the vehicle travels at a low speed, as shown in FIG. 9. Also, the flow rate of pressurized fluid supplied to the control valve 14 is decreased when the load pressure is low, like in the first and second embodiments. Accordingly, the energy consumption can be reduced more.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus comprising:

a motor driven by a motor drive circuit;

a pump driven by said motor to discharge pressurized working fluid at a flow rate proportional to a rotational speed of said motor;

a power cylinder for generating an assist force;

a control valve connected to said pump, to a pair of chambers of said power cylinder, and to a reservoir, said control valve being responsive to a steering operation to supply the pressurized fluid to the chambers of said power cylinder; and a load-pressure responsive valve provided between a discharge passage to which pressurized fluid is discharged from said pump and a low pressure region, said load pressure responsive valve being operable for bypassing to the low pressure region the fluid discharged from said pump to said control valve so as to reduce an amount of pressurized fluid supplied to said control valve when the control valve is in a neutral state, and for increasing an amount of pressurized fluid supplied to said control valve when the load pressure of said pump increases upon operation of said control valve.

2. A power steering apparatus according to claim 1, wherein said load-pressure responsive valve is provided with a variable throttle which is in an opened state when the load pressure is low and is closed as the load pressure increases, and pressurized fluid discharged from said pump is bypassed to the low pressure region via said variable throttle.

3. A power steering apparatus according to claim 2, wherein said load-pressure responsive valve is provided with a spool for controlling the variable throttle, and pressures at upstream and downstream sides of a metering orifice are applied to opposite ends of said spool which have different pressure receiving areas.

4. A power steering apparatus according to claim 1, wherein said load-pressure responsive valve comprises:

a spool slidably fitted in a sleeve of said load-responsive valve;

an annular seat attached to one end of said sleeve, said annular seat having an opening which is slightly smaller than an outer diameter of said spool; and a conical poppet that is radially movably fitted on one end of the spool which is adaptable to open and close the opening of the annular seat and to compensate for any misalignment between the spool and the annular seat.

5. A power steering apparatus according to claim 4, wherein said load pressure-responsive valve further comprises a spring which forces the spool in a direction such that said poppet is spaced from the opening of the annular seat when the control valve is in said neutral state to permit said pressurized fluid passing through said load-responsive valve to drain to said reservoir, and upon operation of the control valve, the load pressure increases so as to advance the spool against the spring in a direction such that the opening of the seat is closed by said poppet.

6. A power steering apparatus comprising:

a sensor for detecting a speed of a vehicle;

a motor driven to rotate at a rotational speed corresponding to the speed of the vehicle detected by the sensor;

a pump driven by said motor to discharge pressurized working fluid at a rate proportional to the rotational speed of said motor;

a power cylinder for generating an assist force;

a control valve connected to said pump, to a pair of chambers of said power cylinder, and to a reservoir, said control valve being responsive to a steering operation to supply the pressurized fluid to the chambers of said power cylinder; and a load-pressure responsive valve provided between a discharge passage to which pressurized fluid is discharged from said pump and a low pressure region, said load-pressure responsive valve being operable for bypassing to the low pressure region the fluid discharged from said pump to said control valve so as to reduce an amount of pressurized fluid supplied to said control valve when the control valve is in a neutral state, and for increasing an amount of pressurized fluid supplied to said control valve when a load pressure of said pump increases upon operation of said control valve.

7. A power steering apparatus according to claim 6, wherein said load-pressure responsive valve is provided with a variable throttle which is in an opened state when the load pressure is low and is closed as the load pressure increases, and the pressurized fluid discharged from said pump is bypassed to the low pressure region via said variable throttle.

8. A power steering apparatus according to claim 7, wherein said load-pressure responsive valve is provided with a spool for controlling the variable throttle, and pressures at upstream and downstream sides of a metering orifice are applied to opposite ends of said spool which have different pressure receiving areas.

9. A power steering apparatus according to claim 6, wherein said load-pressure responsive valve comprises:

a spool slidably fitted in a sleeve of said load-responsive valve;

an annular seat attached to one end of the sleeve, said annular seat having an opening which is slightly smaller than an outer diameter of the spool; and a conical poppet which is radially movably fitted on one end of the spool and is adaptable to open and close the opening of the annular seat.

10. A power steering apparatus according to claim 9, wherein said load pressure-responsive valve further comprises a spring which forces the spool in a direction such that said poppet is spaced from the opening of the annular seat when the control valve is in said neutral state to permit said pressurized fluid passing through said load-responsive valve to drain to said reservoir, and upon operation of the control valve, the load pressure increases so as to advance the spool against the spring in a direction such that the opening of the seat is closed by said poppet.

* * * * *